US008898624B2

(12) United States Patent
Bouillet et al.

(10) Patent No.: US 8,898,624 B2
(45) Date of Patent: Nov. 25, 2014

(54) METHOD AND APPARATUS FOR SIMPLIFIED ASSEMBLY OF PARAMETRIC INFORMATION PROCESSING APPLICATIONS

(75) Inventors: Eric Bouillet, Malahide (IE); Zhen Liu, Tarrytown, NY (US); Anton V. Riabov, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 1116 days.

(21) Appl. No.: 12/114,920

(22) Filed: May 5, 2008

(65) Prior Publication Data

US 2009/0276753 A1 Nov. 5, 2009

(51) Int. Cl.
*G06F 9/44* (2006.01)
*G06F 17/30* (2006.01)

(52) U.S. Cl.
CPC .............. *G06F 17/30893* (2013.01)
USPC ............. 717/106; 717/107; 717/109

(58) Field of Classification Search
None
See application file for complete search history.

(56) References Cited

U.S. PATENT DOCUMENTS

| | | | |
|---|---|---|---|
| 4,571,678 A | 2/1986 | Chaitin | |
| 5,159,685 A | 10/1992 | Kung | |
| 5,187,788 A | 2/1993 | Marmelstein | |
| 5,657,428 A | 8/1997 | Tsuruta et al. | |
| 5,659,754 A | 8/1997 | Grove et al. | |
| 5,675,757 A | 10/1997 | Davidson et al. | |
| 5,675,805 A | 10/1997 | Boldo et al. | |
| 5,696,693 A | 12/1997 | Aubel et al. | |
| 5,937,195 A | 8/1999 | Ju et al. | |
| 5,999,729 A | 12/1999 | Tabloski, Jr. et al. | |
| 6,032,142 A | 2/2000 | Wavish | |
| 6,053,951 A | 4/2000 | McDonald et al. | |
| 6,339,783 B1 | 1/2002 | Horikiri | |
| 6,347,320 B1* | 2/2002 | Christensen et al. | 707/999.001 |
| 6,430,698 B1 | 8/2002 | Khalil et al. | |
| 6,601,112 B1 | 7/2003 | O'Rourke et al. | |
| 6,665,863 B1 | 12/2003 | Lord et al. | |
| 6,721,747 B2 | 4/2004 | Lipkin | |
| 6,792,595 B1 | 9/2004 | Storistenau et al. | |
| 6,799,184 B2 | 9/2004 | Bhatt et al. | |
| 6,813,587 B2 | 11/2004 | McIntyre et al. | |
| 6,891,471 B2 | 5/2005 | Yuen et al. | |
| 6,983,446 B2 | 1/2006 | Charisius et al. | |
| 7,000,022 B2 | 2/2006 | Lisitsa et al. | |
| 7,062,762 B2 | 6/2006 | Krishnamurthy et al. | |
| 7,103,873 B2 | 9/2006 | Tanner et al. | |
| 7,164,422 B1* | 1/2007 | Wholey et al. | 345/440.1 |
| 7,174,536 B1 | 2/2007 | Kothari et al. | |
| 7,222,182 B2 | 5/2007 | Lisitsa et al. | |

(Continued)

OTHER PUBLICATIONS

Heinlein, C. "Workflow and Process Synchronization with Interaction Expressions and Graphs", 2001, IEEE, p. 243-252.*

(Continued)

*Primary Examiner* — Qamrun Nahar
(74) *Attorney, Agent, or Firm* — F. Chau & Associates LLC

(57) ABSTRACT

A method for assembling parametric information processing applications, includes: receiving a composition request; composing a processing graph for the request, wherein the processing graph represents an application that includes at least one component; identifying a deployment parameter of the component and requesting a value of the parameter; receiving the parameter value; applying the parameter value to the application; and deploying the application with the parameter value in an execution environment.

20 Claims, 11 Drawing Sheets

(56) References Cited

U.S. PATENT DOCUMENTS

| | | |
|---|---|---|
| 7,231,632 B2 | 6/2007 | Harper |
| 7,263,694 B2 | 8/2007 | Clewis et al. |
| 7,290,244 B2 | 10/2007 | Peck et al. |
| 7,334,216 B2 | 2/2008 | Molina-Moreno et al. |
| 7,409,676 B2 | 8/2008 | Agarwal et al. |
| 7,426,721 B1 | 9/2008 | Saulpaugh et al. |
| 7,466,810 B1 | 12/2008 | Quon et al. |
| 7,472,379 B2 | 12/2008 | Chessell et al. |
| 7,499,906 B2 | 3/2009 | Kloppmann et al. |
| 7,536,676 B2 | 5/2009 | Baker et al. |
| 7,543,284 B2 | 6/2009 | Bolton et al. |
| 7,565,640 B2 | 7/2009 | Shukla et al. |
| 7,614,041 B2 | 11/2009 | Harper |
| 7,627,808 B2 | 12/2009 | Blank et al. |
| 7,657,436 B2 | 2/2010 | Elmore et al. |
| 7,681,177 B2 | 3/2010 | LeTourneau |
| 7,685,566 B2 | 3/2010 | Brown, Jr. et al. |
| 7,716,167 B2 | 5/2010 | Colossi et al. |
| 7,716,199 B2 | 5/2010 | Guha |
| 7,730,467 B1 | 6/2010 | Hejlsberg et al. |
| 7,756,855 B2 | 7/2010 | Ismalon |
| 7,769,747 B2 | 8/2010 | Berg et al. |
| 7,773,877 B2 | 8/2010 | Yang et al. |
| 7,792,836 B2 | 9/2010 | Taswell |
| 7,797,303 B2 | 9/2010 | Roulland et al. |
| 7,809,801 B1 | 10/2010 | Wang et al. |
| 7,810,085 B2 | 10/2010 | Shinnar et al. |
| 7,814,123 B2 | 10/2010 | Nguyen et al. |
| 7,827,210 B2 | 11/2010 | Meliksetian et al. |
| 7,860,863 B2 | 12/2010 | Bar-Or et al. |
| 7,861,151 B2 | 12/2010 | Milic-Frayling et al. |
| 7,877,387 B2 | 1/2011 | Hangartner |
| 7,882,485 B2 | 2/2011 | Feblowitz et al. |
| 7,886,269 B2 | 2/2011 | Williams et al. |
| 7,886,273 B2 | 2/2011 | Hinchey et al. |
| 7,900,201 B1 | 3/2011 | Qureshi et al. |
| 7,954,090 B1 | 5/2011 | Qureshi et al. |
| 7,958,148 B2 | 6/2011 | Barnes et al. |
| 7,984,417 B2 | 7/2011 | Ben-Zvi et al. |
| 7,984,423 B2 | 7/2011 | Kodosky et al. |
| 7,992,134 B2 | 8/2011 | Hinchey et al. |
| 8,001,527 B1 | 8/2011 | Qureshi et al. |
| 8,032,522 B2 | 10/2011 | Goldstein et al. |
| 8,037,036 B2 | 10/2011 | Blumenau et al. |
| 8,046,737 B2 | 10/2011 | Wittenberg et al. |
| 8,078,487 B2 | 12/2011 | Li et al. |
| 8,078,953 B2 | 12/2011 | Kunz et al. |
| 8,086,598 B1 | 12/2011 | Lamb et al. |
| 8,122,006 B2 | 2/2012 | de Castro Alves et al. |
| 2002/0109706 A1 | 8/2002 | Lincke et al. |
| 2004/0015783 A1 | 1/2004 | Lennon et al. |
| 2004/0249664 A1 | 12/2004 | Broverman et al. |
| 2005/0096960 A1 | 5/2005 | Plutowski et al. |
| 2005/0097224 A1 | 5/2005 | Chen et al. |
| 2005/0125738 A1 | 6/2005 | Srivastava et al. |
| 2005/0125739 A1 | 6/2005 | Thompson et al. |
| 2005/0159994 A1 | 7/2005 | Huddleston et al. |
| 2005/0172306 A1 | 8/2005 | Agarwal et al. |
| 2005/0177406 A1 | 8/2005 | Facciorusso et al. |
| 2005/0192870 A1 | 9/2005 | Geddes |
| 2006/0212836 A1 | 9/2006 | Khushraj et al. |
| 2007/0033590 A1 | 2/2007 | Masuouka et al. |
| 2007/0043607 A1 | 2/2007 | Howard et al. |
| 2007/0112777 A1 | 5/2007 | Field et al. |
| 2007/0129953 A1 | 6/2007 | Cunningham et al. |
| 2007/0136281 A1 | 6/2007 | Li et al. |
| 2007/0190499 A1 | 8/2007 | Baur |
| 2007/0204020 A1 | 8/2007 | Anderson et al. |
| 2007/0208685 A1 | 9/2007 | Blumenau |
| 2007/0244912 A1 | 10/2007 | Kawaguchi |
| 2007/0245298 A1 | 10/2007 | Grabarnik et al. |
| 2007/0250331 A1 | 10/2007 | Liu et al. |
| 2007/0282746 A1 | 12/2007 | Anke et al. |
| 2008/0065455 A1 | 3/2008 | Sun et al. |
| 2008/0086485 A1 | 4/2008 | Paper |
| 2008/0140778 A1 | 6/2008 | Banavar et al. |
| 2008/0168529 A1 | 7/2008 | Anderson et al. |
| 2008/0243484 A1 | 10/2008 | Mohri et al. |
| 2009/0070165 A1 | 3/2009 | Baeuerle et al. |
| 2009/0100407 A1 | 4/2009 | Bouillet et al. |
| 2009/0125366 A1 | 5/2009 | Chakraborty et al. |
| 2009/0177957 A1 | 7/2009 | Bouillet et al. |
| 2009/0192783 A1 | 7/2009 | Jurach, Jr. et al. |
| 2009/0276753 A1 | 11/2009 | Bouillet et al. |
| 2010/0293043 A1 | 11/2010 | Atreya et al. |
| 2011/0078285 A1 | 3/2011 | Hawkins et al. |

OTHER PUBLICATIONS

N. Jain, L. Amini, H. Andrade, R. King, Y. Park, P. Selo and C. Venkatramani, "Design, Implementation, and Evaluation of the Linear Road Benchmark on the Stream Processing Core", Proceedings of ACM SIGMOD 2006.

Zhen Liu, Anand Ranganathan and Anton Riabov, "A Planning Approach for Message-Oriented Semantic Web Service Composition", in AAAI-2007.

A. Riabov and Z. Liu. Planning for stream processing systems. In AAAI'05, Jul. 2005.

E. Sirin and B. Parsia. Planning for Semantic Web Services. In Semantic Web Services Workshop at 3rd ISWC, 2004.

M. Pistore, P. Traverso, P. Bertoli, and A. Marconi. Automated synthesis of composite BPEL4WS web services. In ICWS, 2005.

A. Riabov and Z. Liu. Scalable planning for distributed stream processing systems. In ICAPS'06, 2006.

K. Whitehouse, F. Zhao, and J. Liu. Semantic streams: A framework for composable semantic interpretation of sensor data. In EWSN'06, 2006.

Xie et al., "An additive reliability model for the analysis of modular software failure data", Oct. 24, 1995, IEEE, p. 188-193.

Groen et al., "Reliability data collection and analysis system", Aug. 24, 2004, IEEE, p. 43-48.

Camilo Rostoker, Alan Wagner, Holger Hoos, "A Parallel Workflow for Real-time Correlation and Clustering of High-Frequency Stock Market Data", (Mar. 26-30, 2007), Parallel and Distributed Processing Symposium, 2007. IPDPS 2007. IEEE International pp. 1-10 [retrieved from http://ieeexplore.ieee.org/stamp/stamp.jsp?tp=&arnumber=4227944&isnumber=4227918].

Rana et al., An XML Based Component Model for Generating Scientific Applications and Performing Large Scale Simulations in a Meta-computing Environment, Google 2000, pp. 210-224.

Santos-Neto et al., Tracking Usage in Collaborative Tagging Communities, Google 2007, pp. 1-8.

Li et al. Collaborative Tagging Applications and Approaches, IEEE Sep. 2008, pp. 1-8 (14-21).

D.. Hinchcliffe, "A bumper crop of new mashup platforms", http://blogs.zdnet.com/Hinchcliffe/?p=111&tag=nl.e622.

Narayanan, S., and McIlraith. S. 2002, Simulation, verification and automated composition of web services, in WWW'02.

Traverso, P., and Pistore, M. 2004, Automated composition of semantic web services into executable processes, in ISWC'04.

Marti Hearst, Design Recommendations for Hierarchical Faceted Search Interfaces, ACM SIGIR Workshop on Faceted Search, Aug. 2006.

Lyritsis et al, "TAGs; Scalable threshold based algorithms for proximity computation in graphs", ACM EDBT, pp. 295-306, 2011.

Riabov et al., Wishful Search: Interactive Composition of Data Mashups, Google 2008, pp. 775-784.

Habernal et al., Active Tags for Semantic Analysis, Google 2008, pp. 69-76.

Comito et al, "Selectively based XML query processing in structured peer to peer networks", ACM IDEAS, pp. 236-244, 2010.

Jiang et al, "XML RL update language: syntax and semantics", IEEE, pp. 810-816, 2010.

Ma et al, "Mining web graphs for recommendations", IEEE, pp. 1-14, 2011.

Connor et al, "Key key value stores for efficiently processing graph data in the cloud", IEEE, pp. 88-93, 2011.

Baird, R.; Hepner, M.; Jorgenson, N.; Gamble, R., "Automating Preference and Change in Workflows," Seventh International Con-

(56) References Cited

OTHER PUBLICATIONS ference on Composition-Based Software Systems (Feb. 25-29, 2008), pp. 184-193 [retrieved http://ieeexplore.ieee.org/stamp/stamp.jsp?tp=&arnumber=4464023&isnumber=4463987].

Pistore, M.; Barbon, F.; Bertoli, P.; Shaparau, D.; Traverso, P., "Planning and Monitoring Web Service Composition" (2004), AIMSA 2004, LNAI 3192, pp. 106-115 [retrieved from http://www.springerlink.com/content/21nucbh4rrjfk8av/fulltext.pdf].

Peer, J., "Web Service Composition As AI Planning—A Survey", (2005) [retrieved from http://decsai.ugr.es/~faro/CDoctorado/bibliografia/refPlanning4SW/LinkedDocuments/webservice-composition-as-aiplanning-pfwsc.pdf].

Hepner, M., "Dynamic Changes to Workflow instances of Web Services," (2007), University of Tulsa, [retrieved from http://www.seat.utulsa.edu/papers/Hepner07-Dissertation.pdf].

A. Stentz, The Focused D* Algorithm for Real-Time Replanning (IJCAI-1995).

Akkiraju et al., "SEMAPLAN: Combining Planning with Semantic Matching to Achieve Web Service Composition", American Association for Artificial Intelligence 2005, pp. 1-8.

Bohannon et al, "Optimizing view queries to ROLEX to support navigable results trees", ACM, pp. 1-12, 2002.

Sheshagiri et al., "A Planner for Composing Services Described in DAML-S", ACM 2003, pp. 1-5.

Altinel et al., "Damia—A Data Mashup Fabric for Intranet Applications", Sep. 28, 2007, pp. 1370-1373.

* cited by examiner

```
<flow>
<flowInput name="SearchQuery"/>
<call name="yAnswers" class="com.example.URLBuilder">
<input name="prefix"
value="http://answers.yahoo.com/rss/searchq"/>
<input name="suffix" link="SearchQuery"/> </call>
<call name="yNews"class="com.example.URLBuilder">
<input name="prefix"
value="http://news.search.yahoo.com/news/rss"/>
<input name="suffix" link="SearchQuery"/> </call>
<call name="fetchNews" class="com.example.FetchFeed">
<input name="url" link="yNews"/> </call>
<call name="fetchAnswers" class="com.example.FetchFeed">
<input name="url" link="yAnswers"/> </call>
<call name="truncNews" class="com.example.Truncate">
<input name+"feed" link="fetchNews"/> </call>
<call name="truncAnswers" class="com.example.Truncate">
<input name="feed" link="fetchAnswers"/> </call>
<call name="union" class="com.example.Union">
<input name="feed1" link="truncAnswers"/>
<input name="feed2" link="truncNews"/> </call>
<call name="sort" class="com.example.Sort">
<input name="feed" link="union"/> </call>
<flowOutput link="sort"/>
</flow>
```

FIG. 7

```
tag {_URL-_Format}
tag {_Feed-_Format}
tag {_Source-_StickyTag}
tag {FrontPage-_Source}
tag {Opinion-_Source}
tag {Travel-_Source}
tag {News-_Source}
tag {Newspaper-News}
tag {Blog-_Source}
tag {NewYorkTimes-Newspaper}
tag {NYTFrontPage-NewYorkTimes FrontPage}
tag {Yahoo-_Source}
tag {TruncatedFeed-_FeedLength}
tag {FullFeed-_FeedLength}
tag {InForeignLanguage-_Language}
tag {InEnglish-_Language}
tag {InFrench-InForeignLanguage}
tag {Sorted-_SortOrder}
tag {_NotSorted-_SortOrder}
tag {NaturalOrder-_NotSorted}
tag {Unsorted-_NotSorted}
```

FIG. 8

METHOD AND APPARATUS FOR SIMPLIFIED ASSEMBLY OF PARAMETRIC INFORMATION PROCESSING APPLICATIONS

RELATED APPLICATIONS

This application is related to commonly assigned U.S. application Ser. No. 11/872,385, filed Oct. 15, 2007, commonly assigned U.S. application Ser. No. 11/970,262, filed Jan. 7, 2008, commonly assigned U.S. application Ser. No. 11/971,056, filed Jan. 8, 2008, commonly assigned U.S. application Ser. No. 11/971,068, filed Jan. 8, 2008, commonly assigned U.S. application Ser. No. 12/055,606, filed Mar. 26, 2008 and commonly assigned U.S. application Ser. No. 12/106,757, filed Apr. 21, 2008, the disclosures of which are all incorporated by reference herein in their entirety.

BACKGROUND OF THE INVENTION

1. Technical Field

The present invention relates to the assembly of parametric information processing applications.

2. Discussion of the Related Art

Configurable applications for automating processing of syndication feeds (i.e., Atom and RSS) are gaining increasing interest and attention on the Web. There are over 30,000 customized feed processing flows (referred to as "pipes") published on Yahoo Pipes, the most popular service of this kind. Yahoo Pipes offers hosted feed processing and provides a rich set of user-configurable processing modules, which extends beyond the typical syndication tools and includes advanced text analytics such as language translation and keyword extraction. The Yahoo Pipes service also comes with a visual editor for flows of services and feeds. In an example of a flow of feeds and services shown in FIG. 1, the feeds are Yahoo Answers and Yahoo News, which can be parameterized, with truncate, union and sort being services. There exist similar frameworks that are provided as a hosted service (e.g., IBM DAMIA) or as a downloadable server-side software (e.g., /n software's RSSBus, IBM's Mashup Starter Kit and IBM's Project Zero).

Automatic service discovery and composition is one of the promises of Service Oriented Architecture (SOA) that is hard to achieve in practice. Currently composition is done with graphical tools by manually selecting services and establishing their interactions. Business Process Execution Language (BPEL)-WS has been developed to describe composite services. However, this process is tedious and requires extensive knowledge of services being composed. Automatic composition methods aim to provide a solution to this.

Automatic composition work has been focusing on composition using simple compatibility constraints, as well as semantic descriptions of services, such as Ontology Web Language (OWL)-S. A drawback of these approaches is that they do not provide an easy way of interacting with a composer/user. For example, even if the user is goal-oriented and does not require knowledge of services, the user must be familiar with the ontology that was used to describe the services. Furthermore, it is difficult for novice users to create goal specifications, since that requires studying the ontology to learn the terms the system uses. Also, the ontology does not automatically provide a method for verifying the requests. Hence, users do not have any guidance from the system that could help in specifying requests. This turns service composition into a tedious trial and error process.

Similarly to how programs can be composed of operators and functions, composite services describe service invocations and other low-level constructs. Composite services are processing graphs composed of smaller service components. A service component can be an invocation of an existing service, an external data input (e.g., a user-specified parameter or data source), a data processing operator (e.g., an arithmetic operator), or an other (smaller) composite service specified as a processing graph of service components.

While many execution environments include tools that assist users in defining composite services, these tools typically require a detailed definition of the processing flow, including all service components and communication between the components. One example of this type of tool is IBM WebSphere Studio. An example of an execution environment is a stream processing environment, such as Stream Processing Core (SPC), described in N. Jain, L. Amini, H. Andrade, R. King, Y. Park, P. Selo and C. Venkatramani, "Design, Implementation, and Evaluation of the Linear Road Benchmark on the Stream Processing Core", Proceedings of ACM SIGMOD 2006.

In contrast, methods such as planning can be used to automatically compose new composite services based on a high-level input provided by the user, since automatic composition methods require less knowledge about the service components and in general only require the user to specify the composition goal in application domain terms.

For purposes of automatic composition, in many scenarios the service components can be described in terms of their data effects and preconditions. In particular, we assume that a description (such as Web Services Description Language (WSDL) or Java object code with optional metadata annotations) of each service component specifies the input requirements of the service component (such as data type, semantics, access control labels, etc.). We refer to these input requirements as preconditions of service invocation, or simply preconditions. The description also specifies the effects of the service, describing the outputs of the service, including information such as data type, semantics, etc. In general, a component description may describe outputs as a function of inputs, so that the description of the output can only be fully determined once the specific inputs of the component have been determined. Note that in practical implementations the invocations can be synchronous, such as subroutine or Remote Procedure Call (RPC) calls, or asynchronous, such as asynchronous procedure calls or message exchange or message flow. In stream processing applications the communication between components requires sending data streams from one component to another in the deployed processing graph.

Under these assumptions, an automated planner can then be used to automatically assemble processing graphs based on a user-provided description of the desired output of the application. The descriptions of the components are provided to the planner in the form of a domain description. The planner can also take into account the specification of available primal inputs to the workflow, if not all inputs are available for a particular planning request.

The planner composes a workflow by connecting components, starting from the primal inputs. It evaluates possible combinations of components, by computing descriptions of component outputs, and comparing them to preconditions of components connected to the output. More than one component input can be connected to one component output or one primal input. Logically, this amounts to sending multiple copies of data produced by the component output, with one copy sent to each of the inputs. In practical implementation these do not have to be copies, and it is possible to pass data by reference instead of by value. The process terminates when an output of a component (or a set of outputs taken together) satisfies the conditions specified in the user goal requirement. Note that all conditions are evaluated at plan time, before any applications are deployed or executed.

If multiple alternative compositional applications can be constructed and shown to satisfy the same request, the planner may use heuristics and utility functions to rank the alternatives and select the highest ranked plans.

The application, once composed, is deployed in an execution environment and can be executed one or more times.

Examples of a planner and an execution environment are described in Zhen Liu, Anand Ranganathan and Anton Riabov, "A Planning Approach for Message-Oriented Semantic Web Service Composition", in AAAI-2007, and in commonly assigned U.S. application Ser. Nos. 11/872,385 and 11/970,262.

Similar work has been done in the contexts of stream processing, web services and grid computing.

A difficulty in planner-based composition involves providing assistance to users when specifying requests. Here, the system must provide its own capabilities information to the user to indicate which requests can be processed, and which changes are allowed to a last submitted request.

These changes can be specified by the user, when the user chooses one modification of the previous request from a set of possible modifications proposed by the system after analyzing the request, for example as described in commonly assigned U.S. application Ser. Nos. 11/872,385 and 11/970, 262.

This approach, however, limits the requests proposed by the system to the set of requests that can be specified by choosing from a finite set of discrete options, and requires a hierarchy of options that helps structure the choices so that the set of options reviewed by the user at each step can be understood by the user. It makes it difficult for the user to specify the parameters of the request that are continuous in nature, even if those values are internally represented by discrete values, such as 'float' or 'real' data type. It also makes it difficult to specify parameters that are chosen from very large non-hierarchical lists of discrete options, for example choosing a state from a list of 50 states.

SUMMARY OF THE INVENTION

In an exemplary embodiment of the present invention, a method for assembling parametric information processing applications, comprises: receiving a composition request; composing a processing graph for the request, wherein the processing graph represents an application that includes at least one component; identifying a deployment parameter of the component and requesting a value of the parameter; receiving the parameter value; applying the parameter value to the application; and deploying the application with the parameter value in an execution environment.

The deployment parameter is a configuration parameter of the component.

The method further comprises storing the received parameter value as a default parameter value. The method further comprises presenting the default parameter value to a user when requesting a value of the parameter.

The parameter value request prompts a user to manually enter the value into a field on a user interface.

The method further comprises: receiving a request to execute the deployed application; identifying an execution parameter for the deployed application and requesting a value of the execution parameter; receiving the value of the execution parameter; invoking the deployed application according to the received execution parameter value; and returning a response provided by the invoked application.

The method further comprises: receiving a request to reconfigure the deployed application; identifying a reconfiguration parameter for the deployed application and requesting a value of the reconfiguration parameter; receiving a reconfiguration parameter value; and reconfiguring the deployed processing graph with the reconfiguration parameter value.

The reconfiguration parameter is a configuration parameter of a component in the deployed application.

The deployment parameter is a parameter operator instance in the processing graph. At least one prompt for each parameter operator instance is presented to a user.

If two deployment parameters are identified that are the same only one parameter value needs to be entered.

In an exemplary embodiment of the present invention, a method for assembling parametric information processing applications, comprises: receiving a composition request; composing a processing graph for the request, wherein the processing graph represents an application that includes at least one component; deploying the application in an execution environment; identifying an execution parameter of the component in the deployed processing graph and requesting a value of the parameter; receiving the parameter value; invoking the deployed application according to the execution parameter value; and returning a response provided by the invoked application.

The method further comprises storing the received parameter as a default parameter value. The method further comprises presenting the default parameter value to a user when requesting a value of the parameter.

The parameter value request prompts a user to manually enter the value in text into a field on a user interface.

The method further comprises: receiving a request to reconfigure the deployed application; identifying a reconfiguration parameter for the deployed application and requesting a value of the reconfiguration parameter; receiving a reconfiguration parameter value; reconfiguring the deployed processing graph with the reconfiguration parameter value.

The reconfiguration parameter is a configuration parameter of a deployed component.

The method further comprises: deploying the reconfigured processing graph in the execution environment; invoking the deployed reconfigured processing graph according to the execution parameter value; and returning a response provided by the invoked processing graph.

The method further comprises: identifying a deployment parameter of the component and requesting a value of the parameter; receiving the parameter value; applying the parameter value to the application; and wherein the application is deployed with the parameter value.

In an exemplary embodiment of the present invention, a method for applying parameters at different stages in the lifecycle of a composed application represented by a processing graph, comprises: composing an application in response to a user-specified goal, wherein the application is represented by a processing graph; deploying the processing graph in an execution environment in a deployment stage; and invoking the deployed processing graph in the execution environment in an execution stage, wherein parameter values are applied to the processing graph in the deployment stage if there are any parameters in the processing graph that require user-input prior to deployment, or wherein parameter values are applied to the processing graph in the execution stage if there are any execution parameter requests.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 7 is an XML description corresponding to the flow shown in FIG. 1 according to an exemplary embodiment of the present invention;

FIG. 8 is a fragment of a tag taxonomy according to an exemplary embodiment of the present invention;

DETAILED DESCRIPTION OF EXEMPLARY EMBODIMENTS

Figure 1:
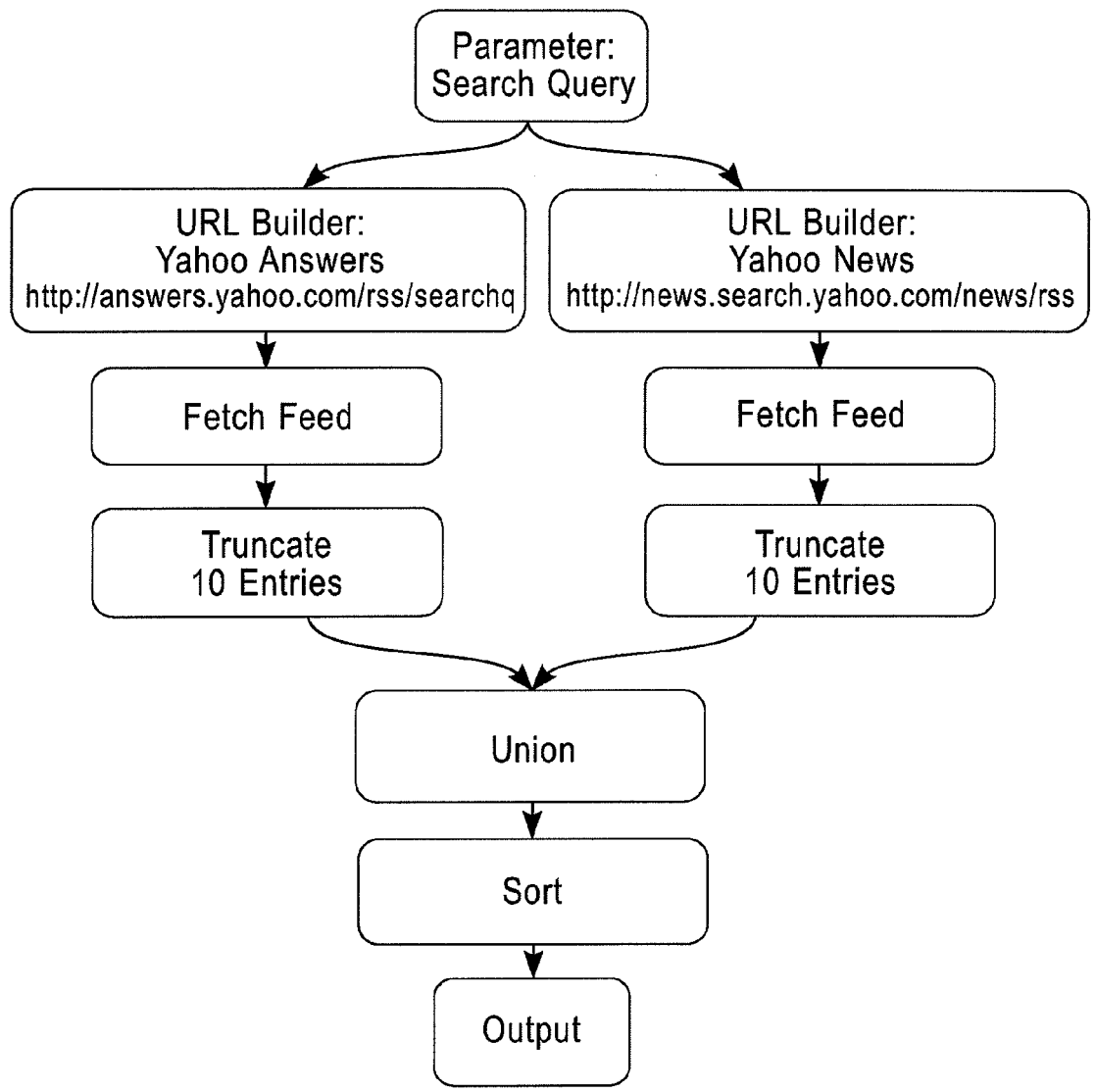
FIG. 1 is a flow of feeds and services.

The present invention provides a user interface to a processing graph composer that allows users to express composition goals and automatically assemble and configure a corresponding processing graph. In one embodiment, similarly to the embodiments described in commonly assigned U.S. application Ser. Nos. 11/872,385 and 11/970,262, the system uses tag clouds to guide the user in this process, updates the tag cloud based on selected tags, and provides instantaneous feedback as new tags are selected by showing a new tag cloud, a preview of the composed processing graph, and optionally, a preview of the results.

To address the drawbacks of existing systems described earlier, our invention allows the composition of parametric processing graphs, and provides an extended user interface that is dynamically reconfigured in accordance with the automatically composed processing graph in order to notify the user about relevant parameters of the composed graph, and request values of these parameters from the user.

Some key aspects of the invention are:
1. It provides a user interface based on an automatic composer of parametric services, consisting of a goal specification and a preview of the composed application.
2. A user interface based on tag clouds, which provides guidance in goal refinement and makes goal specification easy and intuitive.
3. A user interface that allows the user to specify values of service specific parameters. The user interface is automatically reconfigured to accommodate the service parameters.
4. The specification of default values for the parameters, which can be changed by the user, and recalled in a subsequent invocation of the services, or other services that require the same type of parameters.
5. Optionally, the system on which the invention is based can guess partial goals, allowing it to instantly present a preview of the processing graph to the interface, while the goals are being refined.

It is also noted that the invention proposes a method for simplifying service composition and making it accessible to end users, who are familiar with the application domain, but are not necessarily familiar with the set of services that can be composed. The invention enables an intuitively understandable user interface that composes the service based on a minimum required specification, and provides assistance when creating such specification.

The invention further proposes a radically simplified tag-based component description approach to reduce the knowledge engineering work required upfront in order to start using an automatic composer. In addition, the invention proposes a new formalism of planning using tag taxonomies and actions that create new objects.

In the current invention, we have significantly extended the Stream Processing Planning Language (SPPL) planning model to add support for tag taxonomies and tag-based operator instances. It is finally noted that SPPL are good planners for practical implementations, since they can be extended to compute tag clouds and have been shown to be highly scalable with the number of operators.

Figure 2:
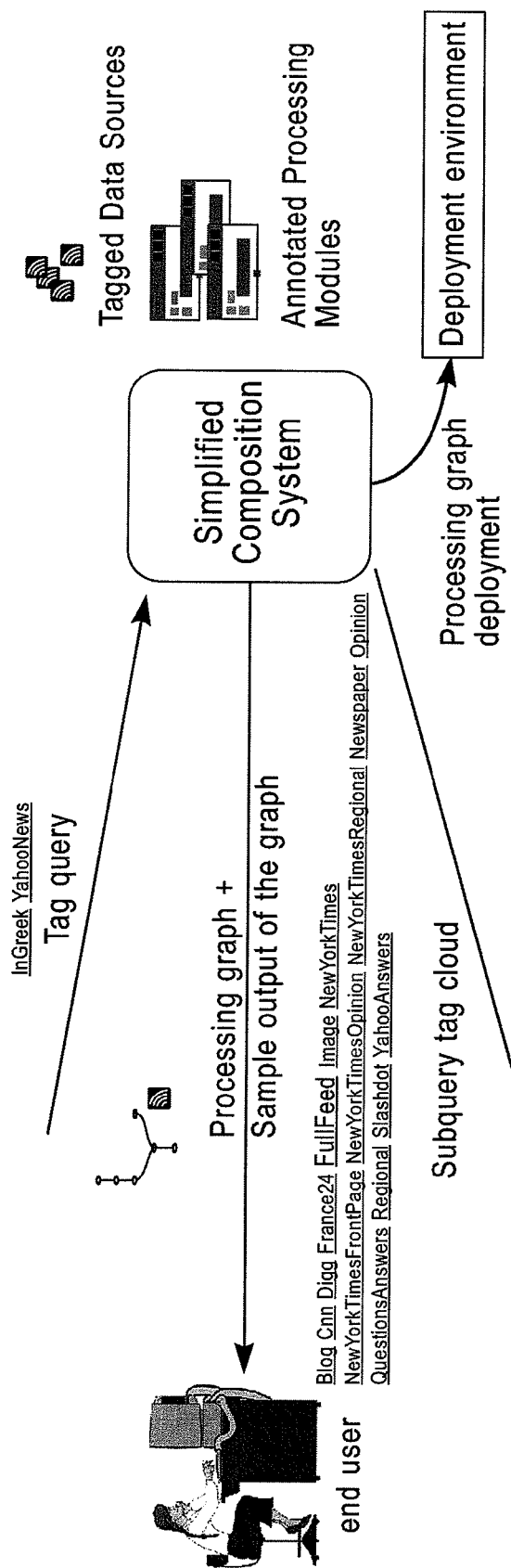
FIG. 2 is a diagram that illustrates an exemplary overview of the operation of the present invention.

FIG. 2 illustrates the operation of the invention. As shown in FIG. 2, in response to a tag query received from a user, the system composes a service (processing graph), deploys the service in a deployment environment, makes a request to that service, and presents output data produced by the service to the end user as a preview of results. To create the processing graph, the system uses an annotated set of services, which could be separated into modules, and data source feeds, some of which require input parameters. The deployment environment is any service orchestration environment, for example, a BPEL application server, a web zero assemble package (projectzero.org), or Yahoo pipes.

An automatic composer (i.e., the illustrated simplified composition system), which is described in detail in commonly assigned U.S. application Ser. No. 11/872,385, can compose services using a type-based composition, where modules are chained so that the type of the output of a module matches the type of the input of the following module until the output of the last module in the application matches the user's goals. Other methods involve a richer and more flexible semantic reasoning in order to match inputs and outputs of the modules, and the data sources. Data sources and modules are described individually when they are registered into our system. The description includes the type or a semantic description of the data sources, and the module's input and outputs.

For the purpose of illustration we refer to this description as SPPL, which is an exemplary language for use with our invention. Note however that our invention applies to other languages used for describing components that can be assembled into larger applications (e.g., WSDL, etc.).

Data sources and modules can include user-inputs which must be specified by the user at runtime whenever an automatically composed service that contains those components is invoked. In order to allow such interaction we use the concept of user-input modules, each of which requires one user input when it is included in a service. A service can include several of those, in which case the user is prompted to enter a separate parameter for each one of them. Such modules can then be used like any other modules to feed downstream modules in the applications. As mentioned earlier, such matching of user-input modules to other modules can be type-based or semantic based. If it is type based it might be necessary to use type (or semantic) specialization in order to distinguish between the different uses of the same concept. For instance, a ZIP code in a carrier application (USPS, UPS, FedEx, DHL) is used both to mean origin ZIP code and destination ZIP code. In which case it should be differentiated by two different types FromZIP and ToZIP, both derived from a ZIP code type, which can be used in other applications that need a single ZIP code (i.e., local weather, local news, etc.). In our invention, the different parameters (e.g., FromZIP, ToZIP, ZIP) are represented by different modules. The description of the modules includes the types of parameters they provide. The description can also include a default value, which is used for previewing and can be changed by the user, with the possibility to recall the last user-entered value so that it becomes the new default for the user. If the invention is implemented as a service-client application, the last entered value can be stored on the server side in a user-profile database. Or, it can be remembered for the duration of the session, for instance using cookies in a web-based application.

Figure 3:
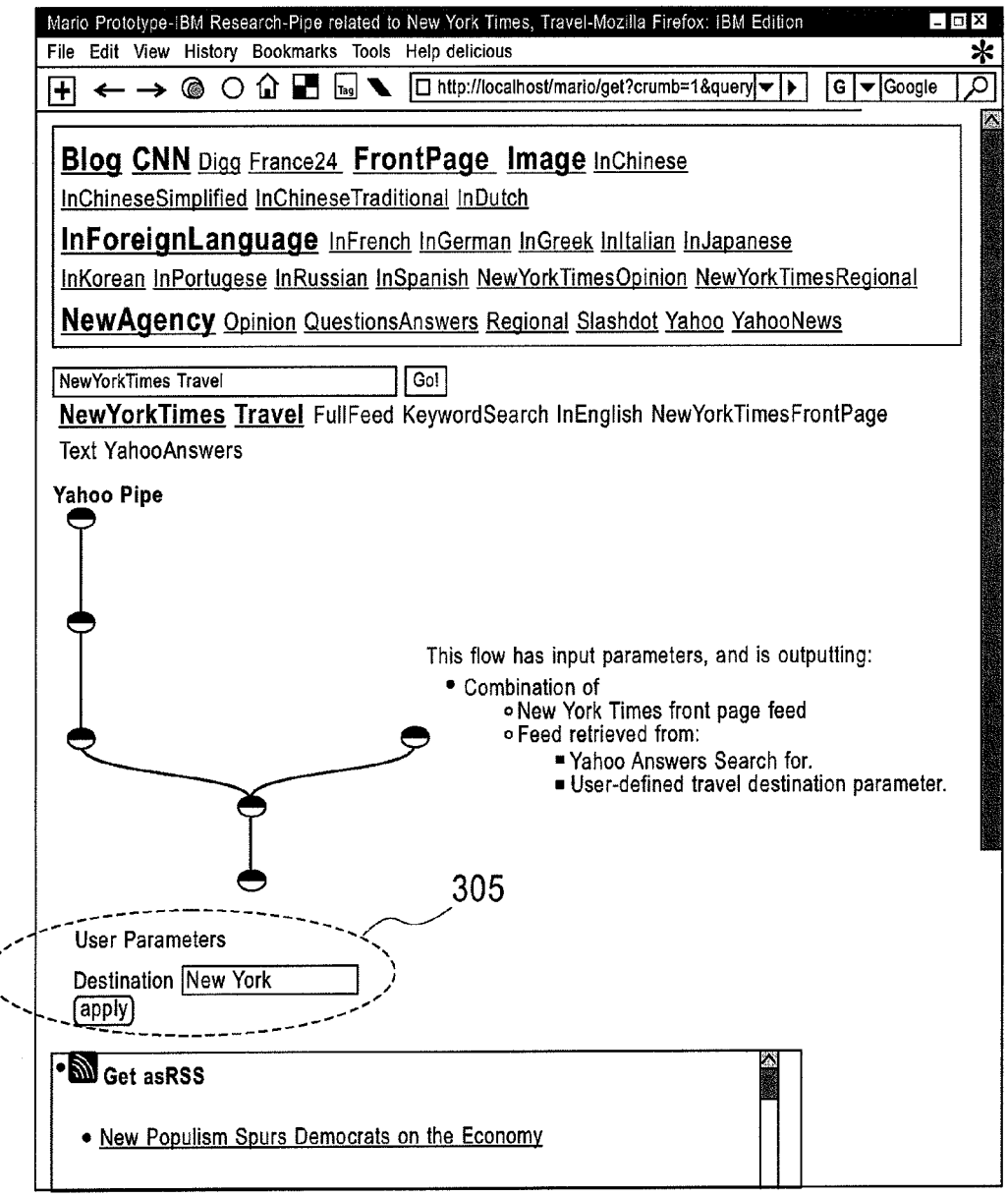
FIG. 3 is a user interface with automatically composed fields for user inputs, an optional result processing graph and a result preview according to an exemplary embodiment of the present invention.

When a service is composed that includes user-input modules, the corresponding processing graph is annotated with meta-data that identify the presence of such user-input, with descriptions such as user-prompts, default values, and value range. The interface is then automatically reconfigured to include fields allowing the user to enter values for the parameters, as specified in the annotation. This is illustrated in FIG. 3. This example, based in this case on a system that composes Yahoo-pipes, illustrates an automatically composed service that fetches and aggregates travel news from different sources about a user-specified travel destination. The processing graph of the example includes a module to input user-specified travel destination parameters. After the processing graph is computed the presence of this module is detected, and the interface is automatically reconfigured to include a field 305 that prompts the user for this parameter. The interface controller is also configured accordingly to create the appropriate query including this user-specified parameter in the argument of the automatically composed service. The user can change this parameter and invoke the service with different values for the parameter if desired.

Figure 4:
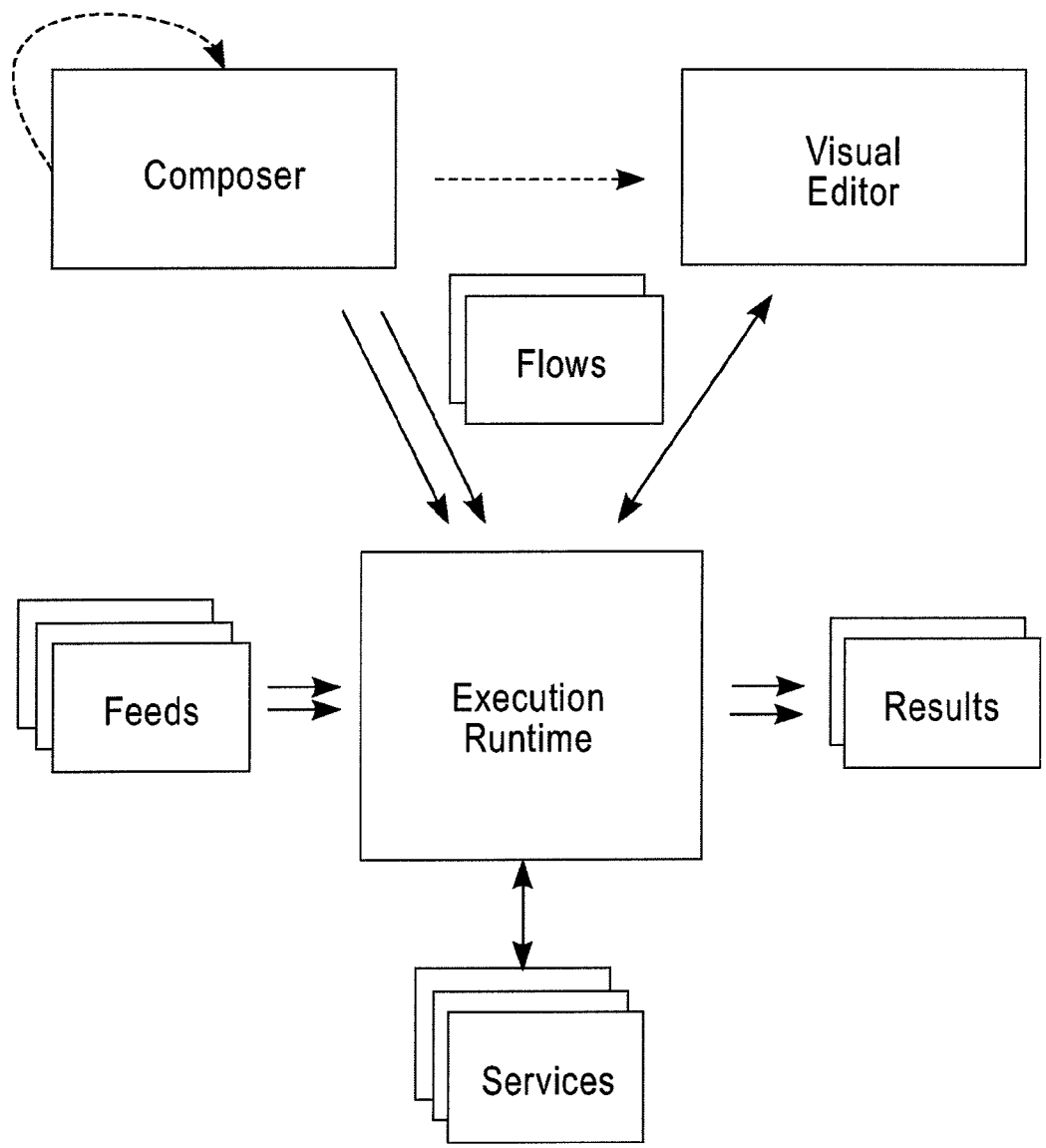
FIG. 4 is a diagram that illustrates a high-level overview of interactions of a composer with other systems according to an exemplary embodiment of the present invention.

For ease of reference, FIG. 4 shows a high-level overview of the interactions betweens systems that can be triggered through the user interface. As shown in FIG. 4, the end user interacts with the composer to create a flow. The flow is deployed to the execution runtime. The runtime executes the flow by calling services to process feeds and produce results. In practice, the processing can be activated by a Web service request sent to the runtime, and the runtime can respond with results represented as a feed, similarly to Yahoo Pipes. The visual editor, if one is available, can be invoked to edit the composed flow. To open the flow composed by the composer, the editor can retrieve a flow definition directly from the runtime, or obtain it from the composer.

The parameters mentioned above are configuration variables that can be applied to the processing graphs at different stages in its lifecycle. Details of applying the parameters and which kinds of parameters are available in a specific implementation of the system depend on the services provided by the execution environment. We distinguish between three different kinds of parameters that can be associated with a processing graph:

Deployment parameters
Execution parameters
Reconfiguration parameters

The same parameter can belong to one or more categories. Deployment parameters are used to parameterize the processing graph before deployment, and are available in all execution environments, since the substitution of values for deployment parameters can take place before the processing graph is deployed in the execution environment. Examples of deployment parameters are configuration parameters of the processing elements in the Stream Processing Core, or configuration parameters of modules in Yahoo Pipes. Execution parameters can be provided when the deployed graph is executed. For example, composite web services can be invoked with different input parameters. Finally, reconfiguration parameters can be used in some execution environments to reconfigure components of already deployed processing graphs. For example, in the Stream Processing Core, the processing graph begins continuous processing immediately after it is deployed, and a separate execution stage is not required. However, in certain applications individual processing elements can be reconfigured after they are deployed by sending messages to the processing elements containing the name and the new value for a reconfiguration parameter.

Figure 5:
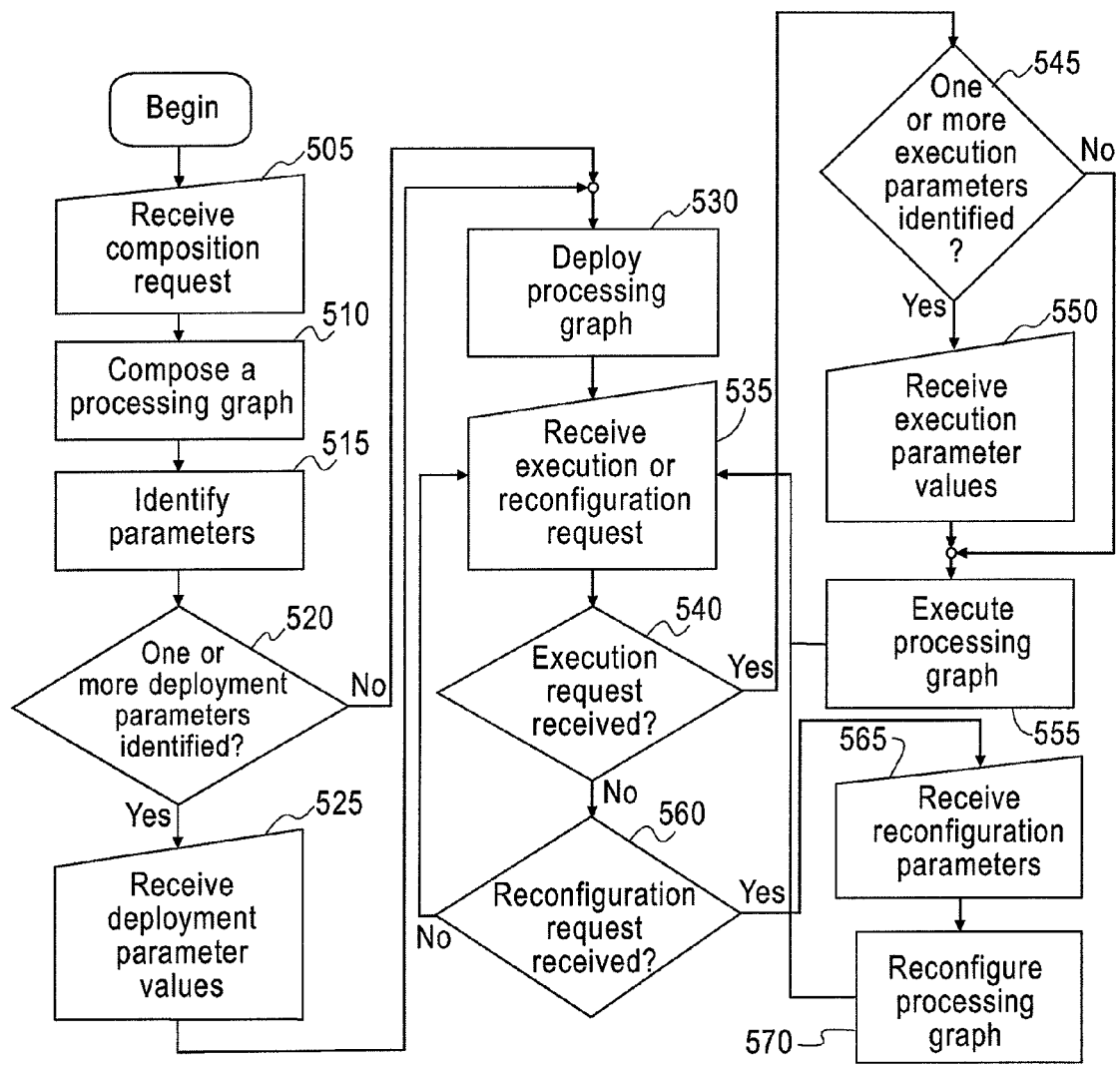
FIG. 5 is a flowchart that illustrates the application of three kinds of parameters at different stages in a lifecycle of a composed parametric information processing application according to an exemplary embodiment of the present invention.

The application of the three kinds of parameters is shown in FIG. 5. Note that not all of the paths in the flowchart can be active in all systems. For example, in a system where the execution environment is Stream Processing Core, the execution parameters are not available, and therefore will not be identified. Note that all three kinds of parameters are identified using the same procedure based on the processing graph.

As shown in FIG. 5, the composer receives a composition request from a user, which may be a human or machine (505) and composes a processing graph (510). The composer then identifies parameters in the processing graph (515). The parameters may be any of the three parameters described above. If one of more deployment parameters are identified (520), the user is prompted to provide deployment parameter values (525), and then, the processing graph is deployed with the parameter values in an execution environment (530). If no deployment parameters are identified (520), the processing graph is deployed without the parameter values in an execution environment (530). After deploying the processing graph, a reconfiguration or execution request may be received (535). If an execution request is received (540), the composer identifies one or more execution parameters (545), and if one or more execution parameters are identified, the user is prompted to provide execution parameter values (550), and then, the processing graph is executed in accordance with the execution parameter values (555). If a reconfiguration request is received (560), reconfiguration parameter values are provided by the user (565), the processing graph is reconfigured (570) and step 535 may be repeated, for example, to execute the reconfigured processing graph.

Two exemplary methods for identifying parameters associated with a processing graph will now be discussed.

Figure 6:
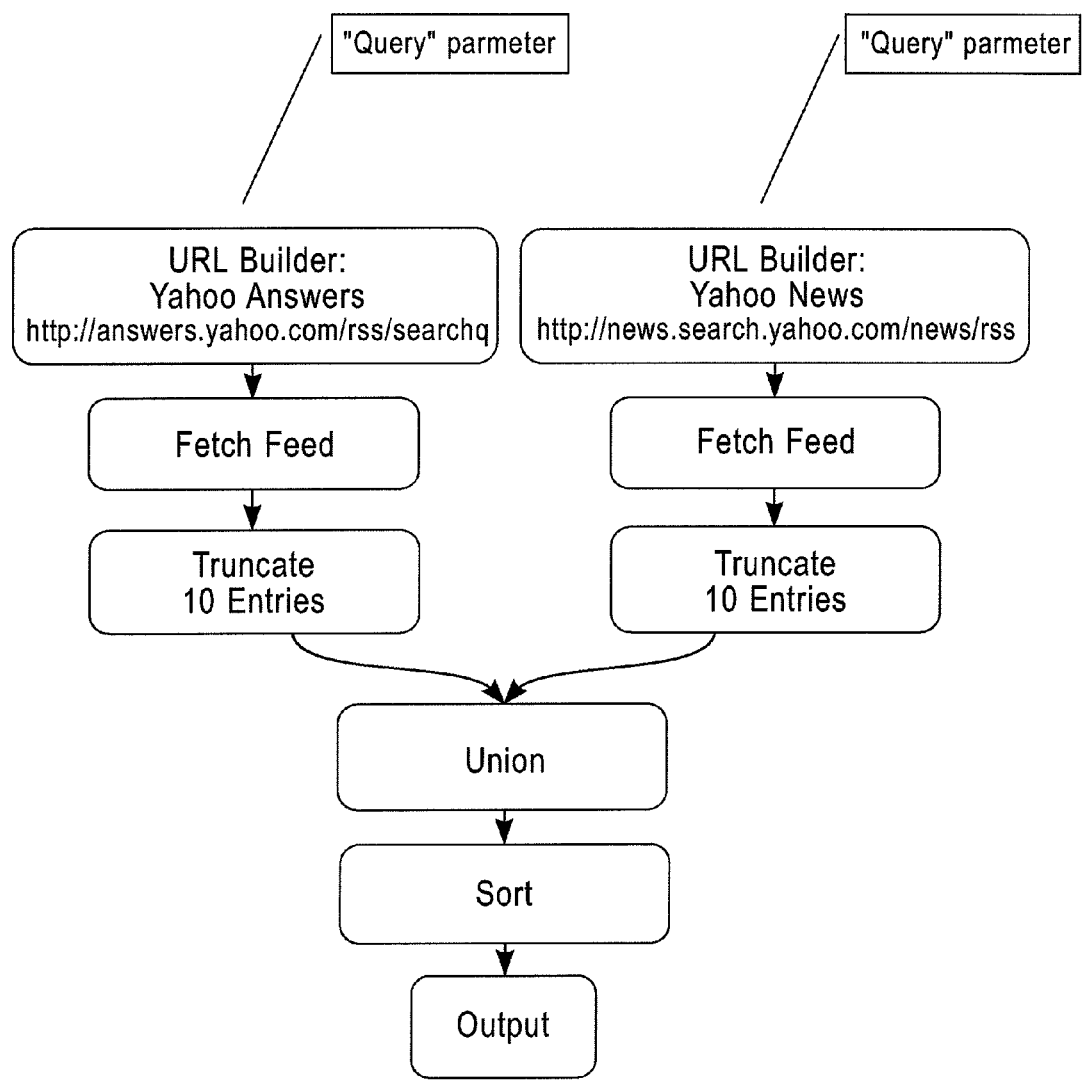
FIG. 6 is a flow of feeds and services that is used to illustrate a step of identifying parameters using descriptions of individual service components according to an exemplary embodiment of the present invention.

There are several levels of functionality provided by this invention. The simplest implementation consists of a composer of processing graphs, as described in commonly assigned U.S. application Ser. Nos. 11/872,385 and 11/970,262, and a post-processing module, which receives the processing graph generated by the composer. Using information about parameterization of individual components supplied in component descriptions, the system then requests the user for parameter values for each component that has a parameter or a set of parameters. In this case, the set of configuration parameters presented to the user is the set of all parameters of all component instances included in the processing graph. For example, once the processing graph shown in FIG. 1 is composed, the system will inspect the description of URL Builder services for the two service instances included in the processing graph, as shown in FIG. 6. Assuming the description for both services states that a parameter called 'query' is required, the system will request two 'query' parameters from the user before execution of the flow. Note that in general each service component instance included in the processing graph can have any number of parameters, and is not limited to one or zero parameters as shown in FIG. 6.

The simple approach described above can be improved by using the composer to detect cases where the same parameter value can be assigned to multiple parameters. In the example shown in FIG. 1, the value 'query' parameter needs to be entered only once, not twice as with the previous method, since both services use the same query to produce the results. This is achieved by modeling parameter values similarly to services, i.e., as operators used during composition, by describing the conditions for matching a parameter value to a service using an output description of the operator representing the parameter and an input description of the operator representing the service. Parameter values then correspond to parameter nodes included in the composed processing graph, e.g., a node titled "parameter: search query" shown in FIG. 1. With this improvement, the query parameter will only be requested once from the user. Similarly to the approach described above, any number of parameters can be requested from the user following this method for the same processing graph, depending on the set of parameter operator instances included in the processing graph.

A detailed description of an abstract formalism for use with the present invention is now provided.

Abstract Model

First, we will give the formal definition of the compositional semantics of a flow. We address this by defining a model for deriving the semantic description of a flow based on the descriptions of its individual components. A key characteristic of our model is that it captures not only the semantics of inputs and outputs, but also the functional dependency between the outputs and the inputs. This model can also be expressed using an SPPL formalism introduced in A. Riabov and Z. Liu. Planning for stream processing systems. In AAAI'05, July 2005, for describing planning tasks, a copy of which is incorporated by reference herein in its entirety, which allows us to use an efficient planning algorithm for flow composition.

Composition Elements

Objects, Tags and Taxonomies

A taxonomy $T=\{t\}$ is a set of tags (i.e., keywords) t. An object o is described by a set of tags $d(o) \subseteq T$ selected from the taxonomy T. An object can be, for example, a resource bookmark, as in del.icio.us, or a feed, as in Syndic8.com.

In the simplest case, for example if T is formed as a folksonomy, by people specifying one or more tags to describe certain objects, the tags in T are unrelated and T is completely unstructured. Introducing a taxonomy structure in T, however, enhances query expressivity, as we explain below, and helps keep tag-based descriptions succinct. The structure of the taxonomy is described by specifying a sub-tag relationship between tags. The following definition is the standard definition of a taxonomy sub-tag relation applied to tagging.

Definition 1. A tag $t1 \in T$ is a sub-tag of $t2 \in T$, denoted $t1::t2$, if all objects described by t1 can also be described by t2. The sub-tag relation is transitive, i.e., if $t1::t2$ and $t2::t3$ implies $t1::t3$ for $\forall$ t1, t2, t3 $\in$ T.

For example, NewYorkTimes Newspaper. For notational convenience we will further assume that each tag is a sub-tag of itself, i.e., $\forall$ t $\in$ T, t::t.

If two tags t1, t2 $\in$ T are such that $t1::t2$ and $t2::t1$, these tags are synonyms, since by definition they describe the same set of objects. We will denote this as $t1 \equiv t2$.

Queries

Queries are used to describe the desired results produced by a composition (i.e., composition goals), or to specify the input conditions of an operator.

Definition 2. A tag query $q \subseteq T$ selects a subset $Q_q(O)$ of an object set $O=\{o\}$ such that each object in the selected subset is described by all tags in q, taking into account sub-tag relationships between tags. Formally, $Q_q(O)=\{o \in O | \forall t \in q \; \exists t' \in d(o) \text{ such that } t'::t\}$.

Note that this definition of a query remains equally effective in configurations with implicit taxonomies, where the sub-tag relationships are not stated explicitly, as well in cases where taxonomies have explicitly stated sub-tag relationships.

For example, consider a set of objects O1 and a taxonomy T1 where NewYorkTimes::Newspaper, and some objects in O1 are annotated with NewYorkTimes. Assume that O2 is created from O1 by explicitly annotating every object in the set $\{o \in O1 | \{NewYorkTimes\} \subseteq d(o)\}$ with Newspaper tag, and taxonomy T2 is the same as T1 but with the sub-tag relationship between Newspaper and NewYorkTimes removed (thus defining an implicit taxonomy). As a result, for q={Newspaper} the selected subset will be the same in both sets of objects.

This is an important property of the proposed approach. It allows mixing implicit taxonomies, typical of folksonomy-like bottom-up modeling approaches, with much more structured and elaborate top-down modeling, which is typical of taxonomies and ontologies. By effectively enabling an easy gradual transition from implicitly defined to explicitly stated sub-tag relationships between tags, as the model evolves, it greatly reduces the effort required for creating a first working set of descriptions compared to the top-down ontology-based modeling approaches, where the significant cost of defining taxonomies must be paid upfront.

Operators

An operator is a basic unit in the composition. Generally, it creates one or more new objects from a subset of existing objects. An operator can require no inputs. When one or more inputs are required, an input condition is specified for each input. The input condition is specified as a tag query, which must be satisfied by the corresponding object provided as input. The outputs are described by specifying tags that are added to and removed from the description of the new objects produced by the output.

The descriptions of the new objects functionally depend on descriptions of input objects. There are two methods of propagating information from the input to the output. The first, explicit, method involves using a typed tag variable that can be bound to one of the tags describing the input object, and then using this variable to describe one or more of the outputs. Note this method can generally be used only to propagate tags of types that are known when the operator is described. In certain cases, however, it is desirable to propagate tags of types that emerge after the operator has been described. To enable the second method of propagation, a special "sticky" tag $\Omega$ is defined to serve as a label for automatically propagating tags. If any sub-tag of $\Omega$ appears in at least one input object description, it will be automatically added to the description of all output objects.

The following definition captures the properties of an operator explained above.

Let $p(f) \geq 0$ be the number of operator variables for operator f;

$\vec{t}(f) = \{t_k(f) | t_k(f) \in T\}_{k=1}^{p(f)}$ be an array of tags representing the tag classes of operator variables $\vec{v}$ for operator f;

$n(f) \geq 0$ be the number of inputs of operator f;

$\vec{q}(f, \vec{v}) = \{q_i(f, \vec{v}) | q_i(f, \vec{v}) \subseteq T\}_{i=1}^{n(f)}$ be an array of tag queries that define input conditions of operator f;

$m(f) \geq 1$ be the number of outputs of operator f;

$\vec{a}(f, \vec{v}) = \{a_j(f, \vec{v}) | a_j(f, \vec{v}) \subseteq T\}_{j=1}^{m(f)}$ be an array of sets of added tags for outputs of operator f;

$\vec{r}(f, \vec{v}) = \{r_j(f, \vec{v}) | r_j(f, \vec{v}) \subseteq T\}_{j=1}^{m(f)}$ be an array of sets of removed tags for outputs of operator f;

Given the above parameters of an operator, and an object set o;

an array of tags $\vec{v} = \{v_k\}_{k=1}^{p(f)}$ assigned to operator variables, such that $v_k \in T$ and $v_k :: t_k(f)$;

an array of input objects $\vec{o} \subseteq o$ satisfying the input conditions parameterized with $\vec{v}$, i.e., such that $\vec{o} = \{o_i\}_{i=1}^{n(f)}$ and $o_i \in Q_{a_j(f, \vec{v})}(o)$ we define the operator as follows.

Definition 3. Operator $f = \langle p, \vec{t}, n, \vec{q}, m, \vec{a}, \vec{r} \rangle$ is a function on the object set, defined as $f(O, \vec{v}, \vec{o}) = O \cup O'$, where $O' = \{o_j' | o \notin O\} i = 1^{m(f)}$ is the set of new objects produced by the operator, and where $$d(o_j') = \left[\bigcup_{i=1}^{n(f)} \{t' \in d(o_i) | t' :: \Omega\}\right] \cup a_j(f, \vec{v}) \setminus r_j(f, \vec{v}).$$

The definition above provides a formula for computing descriptions of new objects produced by the operator: the description of each object is the union of automatically propagated tags derived from $\Omega$ and operator-output-specific added tags, minus the set of operator-output-specific removed tags.

Composition

Composition Semantics

A composition of operators is defined simply as the result of applying one operator to the object set produced by another operator.

Definition 4. The composition of l operator instances formed by operators $f_1, f_2, \ldots f_l$ applied to object subsets $\vec{o}_1, \vec{o}_2, \ldots, \vec{o}_l$ and parameterized with tags $\vec{v}_1, \vec{v}_2, \ldots, \vec{v}_l$ correspondingly is the composite operator $f = \circ f_j, j = 1 \ldots l$ defined as $$f(O) = f_l(\ldots (f_2(f_1(O, \vec{v}_1, \vec{o}_1), \vec{v}_2, \vec{o}_2)), \vec{v}_l, \vec{o}_l).$$

Notice that $f(O) = O \cup O'_1 \cup O'_2 \ldots \cup O'_l$, where $O'_i$ is the set of new objects produced by operator $f_i$. Also note that input objects for each subsequent operator can be selected from the object set produced by the preceding operator, i.e., $\vec{o}_1 \subseteq O_0 \equiv O$ $\vec{o}_2 \subseteq O_1 \equiv O \cup O'_1$

. . . .

$\vec{o}_l \subseteq O_{l-1} \equiv O \cup O'_1 \cup O'_2 \cup \ldots \cup O'_{l-1}$ Definition 5. The composition is valid when the input conditions of each operator instance $f_j$ are satisfied by the object array $\vec{o}_j$, i.e., $$\vec{o}_j, \text{ i.e., } \forall i, jo_{j_i} \in Q_{q_{j_i}(f_j, \vec{v}_j)}(O_{j-1}).$$

Subsequent instances of operators may use objects produced by preceding operators as inputs, i.e., there could exist i and j, $i < j$ such that $o_i \cap O'_j \neq \emptyset$. In other words, there is a data dependency between oj and oi. Data dependencies between operator instances within a composition can be represented using a data dependency graph where arcs connect operator outputs to inputs of other operators. Note that under this model the directed data dependence graphs will always be acyclic.

Goal Driven Composition

The problem of goal-driven composition can now be defined as the problem of finding a composition of operators that produces an object satisfying a given query. As an additional simplifying assumption, we assume that the composition is applied to an empty object set. This assumption is not significantly constraining, since the initial objects can always be produced by operators that do not require any input objects. On the other hand, the assumption allows uniform modeling of both feeds and services as operators.

Given a composition problem $\mathcal{P}(T, \mathcal{F}, g)$, where:

T is a tag taxonomy, $\mathcal{F} = \{f\}$ is a set of operators, g is a composition goal specified as a tag query, $g \subseteq T$, the solution set is defined as follows.

Definition 6. The set of solutions $S(T, \mathcal{F}, g)$ to the goal-driven composition problem $\mathcal{P}(T, \mathcal{F}, g)$ is the set of all valid compositions F of operators in $\mathcal{F}$ such that $Q_g(F(\emptyset)) \neq \emptyset$;

for all operator instances in F, at least one object produced by this instance serves as input to another operator instance, or satisfies the goal query.

The second condition in the definition above helps eliminate from consideration inefficient compositions that have dead-end operator instances producing unused objects.

Composition Ranking

Before the set of compositions $S(T, \mathcal{F}, g)$ can be presented to the user, the compositions must be ranked, with those most likely to satisfy a user's intent appearing first in the list. The ranking is based on a heuristic metric reflecting composition quality. Each operator $f \in F$ is assigned a fixed cost $c(f)$. Cost of an operator instance in a composition is equal to the cost of the corresponding operator.

Definition 7. Rank rank($\hat{f}$) of the composition $\hat{f}(O) = f_n(\ldots (f_2(f_1(O)) \ldots)$ is the sum of the costs of operator instances, i.e., $$\text{rank}(\hat{f}) = \sum_{i=1}^{n} c(f_i).$$

By default for all operators c(f)=1. Hence, the best compositions are the shortest ones. During configuration of the system, the number can be left equal to the default, or configured for some operators to reflect feed or service quality.

Goal Refinement Tag Cloud

The refinement tag cloud provides valuable help to the user in refining the goal. The tag cloud is simply a popularity-weighted set of tags computed over the descriptions of outputs of all compositions in a solution set $S(T, \mathcal{F}, g)$. In theory, if the goal g is empty, the tag cloud is computed over all valid compositions. Although the set of all compositions may indeed be very large, the set of compositions with differently described outputs is much smaller. The SPPL planner can compute the tag cloud without constructing all compositions.

Note that the queries in our model behave as though the super-tags from the taxonomy are always included in the object description with the corresponding sub-tags. The same approach should be used during tag cloud computation. Even if the super-tags are not included in an object description explicitly, they are added to the description automatically for the purposes of computing the weights in the tag cloud. This ensures that even if certain tags do not accumulate enough weight to appear in the visible portion of the tag cloud, they add weight to their super-tags, and will still be accessible through those super-tags.

In the following, we describe how the abstract formalism described above is applied in practice to descriptions of components.

Execution Runtime

As one embodiment, the execution environment can be a simple Java-based runtime. Each service in this runtime implements interface Service with a single public method named process that receives and returns a hashmap containing input and output object values:

```
interface Service {
    Map<String,Object> process(Map<String,Object> inputs);
}
```

The set of hashmap keys used to identify input and output objects in the input and output hashmaps is specific to each service. A separate description is provided to specify the hashmap keys recognized by the service, as well as tag-based annotations on inputs and outputs. This description is then used to construct a description of an operator. Service implementation invokes external web services for sophisticated processing, such as language translation, when necessary.

A simple XML format is used to define a flow and deploy it in the runtime. Once deployed, the flow can be called with user-defined values of parameters, and will produce results. FIG. 7 presents a sample XML description corresponding to the flow shown in FIG. 1.

Flow definition consists of flow inputs (i.e., external parameters), calls (i.e., operator instances) and a flow output. The call elements instruct runtime about the Java classes to be used to process data, and the input objects to be included in the input map. The objects can be specified as string values by specifying value attribute, or linked to outputs of other calls by specifying a link. In the example of FIG. 7, each output map contains just one element, so specifying the name of the call is sufficient to describe a link. Otherwise, for operators that produce more than one object, "callName.elementName" notation is used as a means of resolving potential ambiguity.

Descriptions

The automatic composer requires descriptions of services, feeds, parameters, and taxonomies. These descriptions are translated into operators and other elements of the abstract model described earlier, which is then used by the planner to generate flows. All descriptions can be specified in one file or broken into multiple files, which are then automatically combined into one logical file before processing.

Tag Taxonomies

Taxonomies are described by specifying sub-tag relationships between tags. A tag does not need to be explicitly declared before it is used, but a tag{ } statement is necessary to declare parents of a tag, which follow after '-', for example:

tag {NYTFrontPage-NewYorkTimes FrontPage}.

Tag names beginning with underscore "_" are hidden tags that are never displayed in a user interface, but otherwise behave as normal tags. Hidden tags can be used to express composition constraints that are internal to the system, for example, type constraints. The special tag $\Omega$ is represented as _StickyTag. FIG. 8 shows an example tag taxonomy.

Feed Descriptions

In the example of a feed description below, the output annotation uses tags to describe the content of the feed, as well as its language.

```
feed NYTFrontPage {
    output{ NYTFrontPage InEnglish _URL }
    url {http://www.nytimes.com/services/xml/rss/nyt/HomePage.xml}
}
```

Such descriptions can be generated automatically, for example using Syndic8 tags and default values for language. The description is translated into an operator that has no inputs, and produces a single output object tagged with all tags used in output annotation. If this operator is included in a flow composed by the planner, during flow execution the runtime will bind the corresponding operator instance to a built-in service that returns the URL string as a single entry in the hashmap of output objects.

Service Descriptions

Each service can have a number of inputs and outputs. Service description is directly translated into an operator that requires and produces a corresponding number of objects. For example, the following describes a FetchFeed service.

```
service FetchFeed {
    java {com.example.FetchFeed}
    var {?lang - _Language}
    input[url]{ ?lang _URL }
    output{?lang FullFeed NaturalOrder _Feed Text}
}
```

This description uses a variable named ?lang of type _Language, and declares an input and an output. The output list of tags is treated as a list of added tags by default. However, tags preceded with ~ are interpreted as removed tags.

Note that sub-tags of _Language are not sticky (i.e., are not derived from the special tag represented as _StickyTag), and therefore must be propagated explicitly from input to output using a variable. However, if the FetchFeed operator is applied to the output of the feed operator in the example above, NYTFrontPage tag will be propagated to the output of FetchFeed as well, since that tag is sticky according to the taxonomy in FIG. 8.

Each input and output in the description can have a port name specified in square brackets. In this example, only the input has a port name "url". The port name is the name of the entry in the hashmap that is used to carry the corresponding input or output object. Since there is only one output port, the runtime does not need to know the name of the output object. Finally, java description element specifies the name of the Java class that implements the service.

Flow Parameters and Constants

Flows that take external parameters can also be composed using the same framework. When two or more services within a flow are parametric, the planner can decide whether to expose the service parameters as one input parameter of the flow, or as several separate parameters. This is achieved by using tags to describe service input parameters (as inputs to services), and representing parameter values similarly to feeds, i.e., as operators that produce a single object described by tags. The following is an example of service description that has an external parameter.

```
param Destination {
  default{London}
  parameterType{Execution}
  output{_SearchQuery Travel _String}
}
service YNewsSearchURL {
  java {com.example.URLBuilder}
  input[prefix]{"http://news.search.yahoo.com/news/rss"}
  input[suffix]{_SearchQuery _String}
  output{_URL YahooNews InEnglish}
}
service YAnswersSearchURL {
  java {com.example.URLBuilder}
  input[prefix]{"http://answers.yahoo.com/rss/searchq"}
  input[suffix]{_SearchQuery _String}
  output{_URL YahooAnswers InEnglish}
}
```

Service YNewsSearchURL has two inputs, but the corresponding operator will have only one input. The constant string in quotes is used to initialize the prefix parameter to a constant. In the plan, suffix parameter will be connected to the object produced by the operator corresponding to Destination service. Note that including constants into the description makes it possible to specify different semantic descriptions for different configurations of the same service.

Similarly, YAnswersSearchURL service is described with an additional input that requires tags _SearchQuery and _ String. This description allows the two services, YNewsSearchURL and YAnswersSearchURL, to have the same requirements for the input parameter, and therefore allows the instances of those services to be linked to the same parameter value. The input constraints can contain tags that describe both the data type constraints on acceptable parameter values (e.g., whether the parameter must be a string, a number or a date), and semantic constraints (e.g., that the parameter is a query).

More Service Description Examples

The following examples from the sample application further illustrate different services that can be described in this model.

```
service Truncate10 {
  java {com.example.Truncate}
  var {?lang - _Language}
  var {?sort - _SortOrder}
  input[feed]{_Feed ?lang FullFeed ?sort}
  input[length]{"10"}
  output{_Feed ?lang ShortFeed ?sort}
}
```

```
service TranslateEnFr {
  java {com.example.Translate}
  var {?len - _FeedLength}
  input[feed]{_Feed InEnglish ?len NaturalOrder}
  input[fromLanguage]{"en"}
  input[toLanguage]{"fr"}
  output{_Feed InFrench ?len NaturalOrder}
}
service Union2 {
  java {com.example.UnionOfTwoFeeds}
  var {?lang - _Language}
  var {?len - _FeedLength}
  input[feed1]{_Feed ?lang NaturalOrder ?len}
  input[feed2]{_Feed ?lang NaturalOrder ?len}
  output{_Feed ?lang ?len Unsorted}
}
```

These descriptions describe the services in the application shown in FIG. 1. In addition to the goal shown in that figure, the application supports a set of interesting goals, such as NewYorkTimes InFrench, Technology News ByDate, NewYorkTimes Flickr Image, etc.

Implementation of a Planner With the Provided Descriptions.

In one embodiment, planning (i.e., application composition for a user-specified request) can be accomplished by translating the request and the set of tags and component descriptions into SPPL, and providing the translated material as input to an SPPL planner, such as that described in A. Riabov and Z. Liu. Planning for stream processing systems. In AAAI'05, July 2005. Then, the plans produced by the SPPL planner can be trivially translated into compositional applications and deployed in execution environment.

SPPL representation has been described in commonly assigned U.S. application Ser. No. 11/406,002, filed Apr. 18, 2006.

The semantic model naturally maps to the SPPL formalism, which describes the planning domain as a set of actions that can be composed by the planner. The set of actions is created based on the set of operators. Action preconditions, described by predicates, are created based on operator input conditions. Tags are represented as types in SPPL, and preconditions are specified using a variable of the corresponding type. Action effects are mapped to operator outputs. An SPPL predicate propagation mechanism is used for propagation of sticky and regular tags.

Requesting Parameter Values from the User

In the preceding example, the planner composes the processing graph shown in FIG. 1. For each parameter operator instance included in the processing graph, the system must request a parameter value from the user.

In one embodiment, the system maintains default parameter values for each parameter operator. These default values are shown to the user in the prompt asking to enter parameter values. For example:

Query: New York Travel

The user can then change the value of the parameter. In one embodiment, the new value of the parameter entered by the user is stored and later presented as a default when the same parameter operator is included in the processing graph.

Note that the number of parameter prompts presented to the user corresponds to the number of parameter operator instances included in the processing graph, and at least one prompt for each parameter operator instance is presented.

Depending on the implementation of the execution environment and, in certain scenarios, subject to the structure of the processing graph, the parameter named "Query"

described above can be an execution parameter or a deployment parameter. The value "New York Travel" of an execution parameter is provided as part of an execution request. Alternatively, if "Query" is a deployment parameter, the value of the parameter is fixed at the time of graph deployment and, in general, different values cannot be provided for different execution requests. Instead, the value of a deployment parameter remains the same for each execution of the processing graph.

Finally, if reconfiguration is supported by the processing graph and the execution environment, "Query" can be a reconfiguration parameter. In that scenario, the value of the reconfiguration parameter can be changed between groups of execution requests, remaining the same for each group. For example, the effective value of the parameter can be "New York Travel" for several executions until a reconfiguration request with value "London Travel" is received, after which an effective value of the parameter is changed to "London Travel" for following executions.

Encoding and Applying Parameter Values

Above we described how the parameters are identified and how the values of parameters are requested from the user. The user-specified values for the three different kinds of parameters described earlier are applied to the processing graph at different stages of processing graph lifecycle supported by the execution environment, as shown in FIG. 5. Parameter values are encoded and sent to the execution environment, using encoding and communication mechanisms supported by the execution environment.

Figure 9:
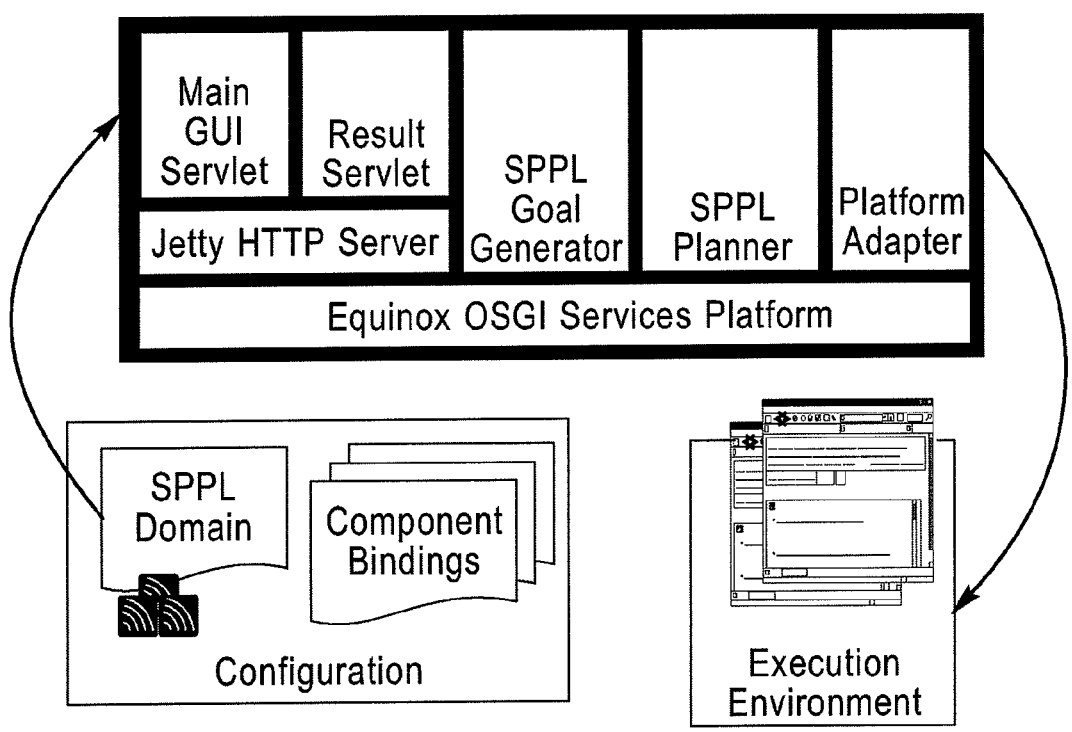
FIG. 9 is a block diagram that illustrates the architecture of a system according to an exemplary embodiment of the present invention.

FIG. 9 shows an example architecture of the system. The system consists of several modules implemented as OSGi services deployed on an Eclipse Equinox (http://www.eclipse.org/equinox/) implementation of an OSGi platform (http://www2.osgi/org/Specifications/HomePage#Release4). The GUI is implemented by two servlets, the Main GUI Servlet that generates the screen shown in FIG. 11 and the Results Servlet that generates the "preview of results" screen element shown in FIG. 11.

Jetty web server (http://jetty.mortbay.com/), integrated with OSGI platform, is used to host the servlets. SPPL Goal Generator service generates SPPL goal descriptions based on a user-specified set of tags submitted via the Main GUI Servlet.

SPPL Planner service invokes an SPPL planner to process the generated goal and generate a processing graph. Examples of a planner and an execution environment are described in Zhen Liu, Anand Ranganathan and Anton Riabov, "A Planning Approach for Message-Oriented Semantic Web Service Composition", in AAAI-2007, the disclosure of which is incorporated by reference herein in its entirety.

The Platform Adapter service translates the processing graph produced by the SPPL planner to the format recognized by the target execution environment. The Platform Adapter service can also include procedures for deploying the translated processing graph in the target execution environment, for invoking the deployed processing graph and retrieving results of its execution, and for generating a preview of results received from the processing graph.

The system is configured by providing an SPPL domain description that includes descriptions of all service components and primal data, and optionally a set of component bindings. The component bindings are files used by the platform adapter to generate a platform-specific representation of the processing graph. The component bindings are typically represented as templates, with one template provided for each component, with placeholders that are filled in by the platform adapter to represent connections between components in generated processing graphs.

A brief hardware description of a computer in which the system or parts of the system described above may be implemented will now be described.

Figure 10:
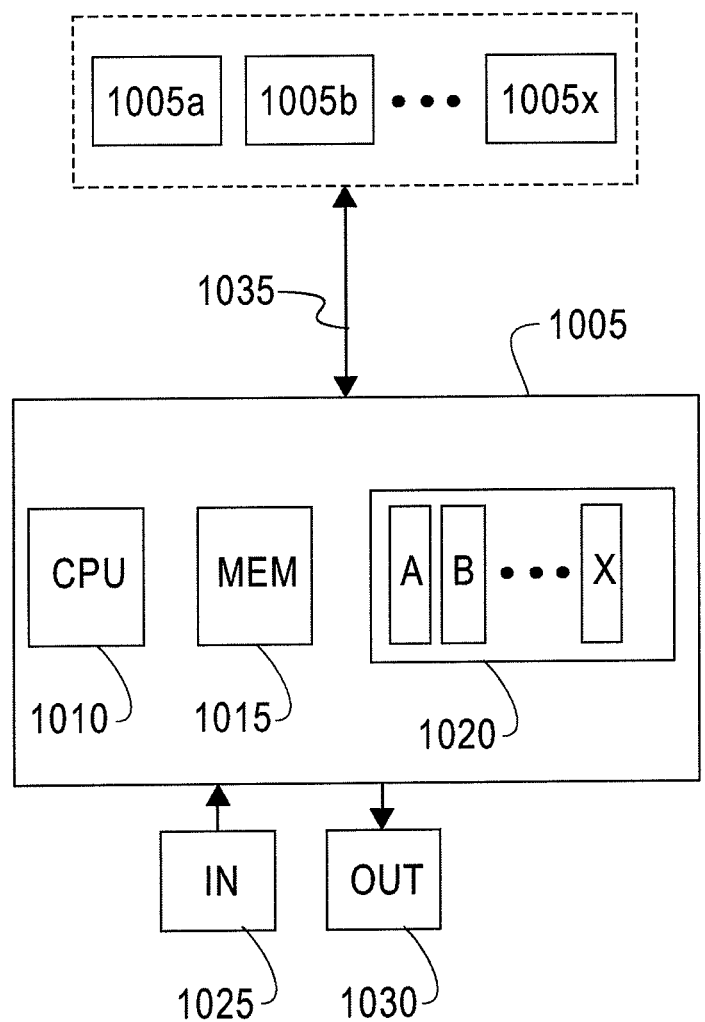
FIG. 10 is a block diagram that illustrates a computer in which an exemplary embodiment of the present invention may be implemented.

As shown in FIG. 10, a computer 1005, which may be a laptop computer or server, includes a central processing unit (CPU) 1010, a memory 1015 and a module set 1020 that includes program code for executing methods in accordance with exemplary embodiments of the present invention. The computer 1005 is coupled to input and output devices 1025 and 1030 and other computers 1005a, b . . . x via a network 1035.

The memory 1015 includes random access memory (RAM) and read only memory (ROM). The memory 1015 can also include a database, disk drive, tape drive or a combination thereof. The input 1025 is constituted by a keyboard or mouse and the output 1030 is constituted by a display or printer. The network 1035 may be the Internet, for example.

Figure 11:
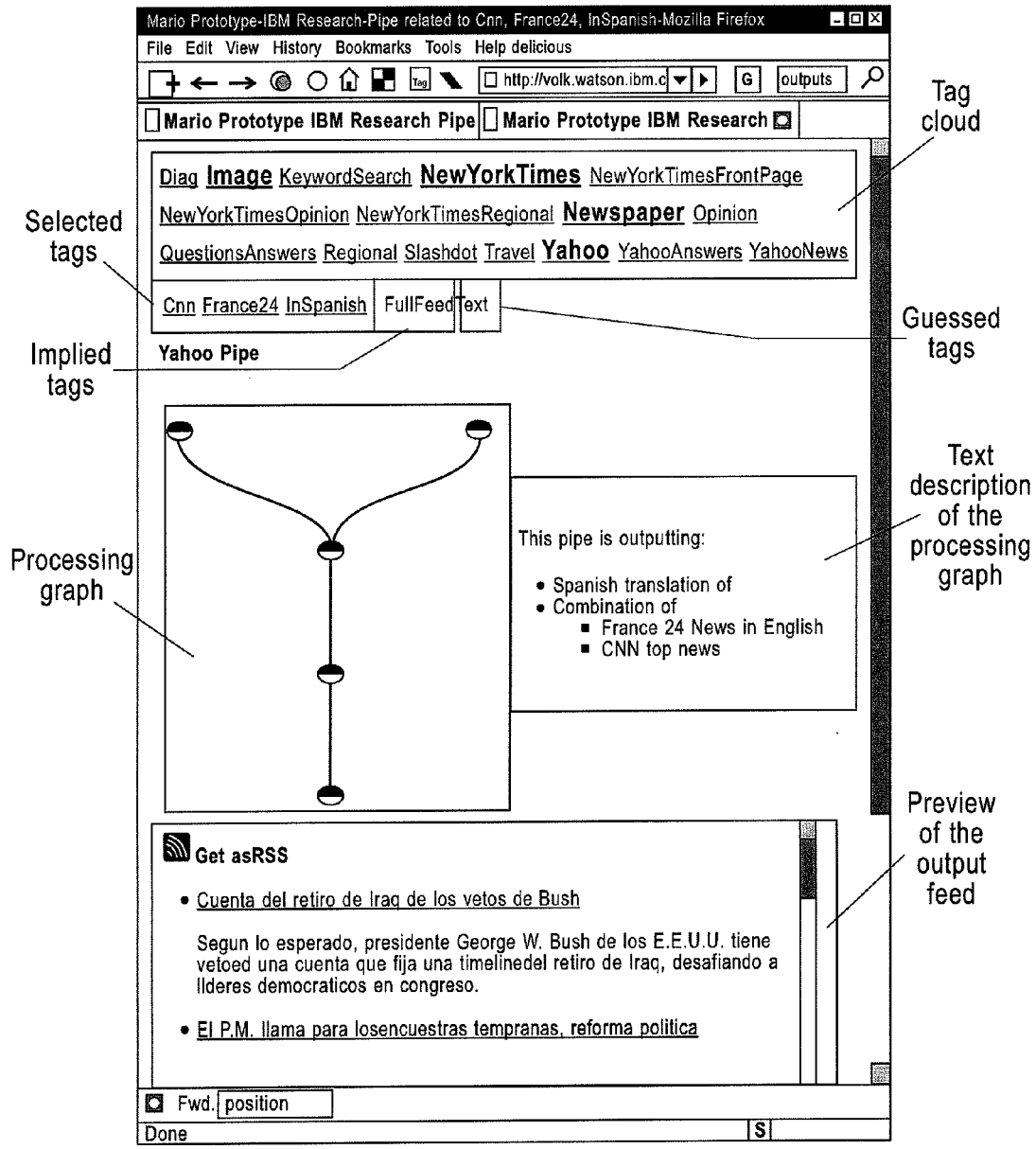
FIG. 11 is a user interface according to an exemplary embodiment of the present invention.

The elements of a user interface according to an exemplary embodiment of the present invention are shown in FIG. 11. These elements will now be explained. Note that the contents of all elements of the interface are updated when new goals are specified by the user.

A tag cloud is a weighted list of tags. Weights reflect the popularity of tags. Clicking on any tag in the tag cloud adds the tag to the planning goal, and to the list of selected tags. This also leads to a new processing graph being composed, and a new tag cloud. The new tag cloud is created in the context of currently selected tags. In particular, the new tag cloud does not include the selected tags or any other tags that never appear on the same feed description where all selected tags appear. When the new processing graph is constructed, it is immediately deployed and an output feed is shown in a preview window.

Implied tags are tags that always appear together with the selected tags. Guessed tags are tags assigned to the output of the graph, and as such, they do not appear in implied or selected tags.

A processing graph element is a description of the processing graph in graphical form. Clicking on the graph opens an editor window, where the graph can be modified after automatic composition. The editor can be provided by the target execution environment.

A text description of the processing graph is created based on the set of modules included in the processing graph. In our implementation, hovering a mouse over modules in a graphical representation on the left causes a highlight to appear on the corresponding line of the textual description on the right.

A preview (or full view) of results produced by the composed and deployed processing graph is shown in the bottom of the window.

The user interface may also include a search string, where tag goals can be typed in, as an alternative to clicking tags in the tag cloud.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for assembling parametric information processing applications, comprising:
   receiving, by a user interface, a composition request, the composition request including a query based on tags displayed at the user interface;
   composing a processing graph in accordance with the query, wherein the processing graph represents an application that includes at least one component;
   identifying a deployment parameter of the component and requesting a value of the parameter by prompting a user via the user interface, wherein the parameter is identified from a description of the component and the value of the parameter is requested prior to running the processing graph and wherein an output description of an operator representing the parameter and an input description of an operator representing a first service are matched to each other and the output description of the operator representing the parameter and an input description of an operator representing a second service are matched to each other so that the value of the parameter corresponds to a parent node feeding into the first and second services in the processing graph;
   displaying, at the user interface, the processing graph, the query and the parameter value prompt at the same time;
   receiving the parameter value;
   applying the parameter value to the application; and
   deploying the application with the parameter value in an execution environment.

2. The method of claim 1, wherein the deployment parameter is a configuration parameter of the component.

3. The method of claim 1, further comprising:
   storing the received parameter value as a default parameter value.

4. The method of claim 3, further comprising:
   presenting the default parameter value to the user when requesting a value of the parameter.

5. The method of claim 1, wherein the user interface includes a field in which the parameter value is to be entered by the user.

6. The method of claim 1, further comprising:
   receiving a request to execute the deployed application;
   identifying an execution parameter for the deployed application and requesting a value of the execution parameter;
   receiving the value of the execution parameter;
   invoking the deployed application according to the received execution parameter value; and
   returning a response provided by the invoked application.

7. The method of claim 1, further comprising:
   receiving a request to reconfigure the deployed application;
   identifying a reconfiguration parameter for the deployed application and requesting a value of the reconfiguration parameter;
   receiving a reconfiguration parameter value; and
   reconfiguring the deployed application with the reconfiguration parameter value.

8. The method of claim 7, wherein the reconfiguration parameter is a configuration parameter of a component in the deployed application.

9. The method of claim 1, wherein the deployment parameter is a parameter operator instance in the processing graph.

10. The method of claim 9, wherein at least one prompt for each parameter operator instance is presented to the user.

11. The method of claim 1, wherein if two deployment parameters are identified that are the same only one parameter value needs to be entered.

12. A method for assembling parametric information processing applications, comprising:
    receiving, by a user interface, a composition request, the composition request including a query based on tags displayed at the user interface, wherein a tag includes keywords corresponding to terms of a business domain;
    composing a processing graph in accordance with the query, wherein the processing graph represents an application that includes at least one component;
    deploying the application in an execution environment;
    identifying an execution parameter of the component in the deployed application and requesting a value of the parameter by prompting a user via the user interface, wherein the parameter is identified from a description of the component and the value of the parameter is requested prior to running the processing graph and wherein an output description of an operator representing the parameter and an input description of an operator representing a first service are matched to each other and the output description of the operator representing the parameter and an input description of an operator representing a second service are matched to each other so that the value of the parameter corresponds to a parent node feeding into the first and second services in the processing graph;
    displaying, at the user interface, the deployed application, the query and the parameter value prompt at the same time;
    receiving the parameter value;
    invoking the deployed application according to the execution parameter value; and
    returning a response provided by the invoked application.

13. The method of claim 12, further comprising:
    storing the received parameter as a default parameter value.

14. The method of claim 13, further comprising:
    presenting the default parameter value to the user when requesting a value of the parameter.

15. The method of claim 12, wherein the user interface includes a field in which the parameter value is to be entered by the user.

16. The method of claim 12, further comprising:
receiving a request to reconfigure the deployed application;
identifying a reconfiguration parameter for the deployed application and requesting a value of the reconfiguration parameter;
receiving a reconfiguration parameter value; and
reconfiguring the deployed application with the reconfiguration parameter value.

17. The method of claim 16, wherein the reconfiguration parameter is a configuration parameter of a deployed component.

18. The method of claim 16, further comprising:
deploying the reconfigured application in the execution environment;
invoking the deployed reconfigured application according to the execution parameter value; and
returning a response provided by the invoked reconfigured application.

19. The method of claim 12, further comprising:
identifying a deployment parameter of the component and requesting a value of the parameter;
receiving the parameter value;
applying the parameter value to the application; and
wherein the application is deployed with the parameter value.

20. A method, comprising:
composing an application in response to a tag query that identifies a user-specified goal, wherein the application is represented by a processing graph and a tag is not an HTML tag;
deploying the processing graph in an execution environment in a deployment stage; and
invoking the deployed processing graph in the execution environment in an execution stage,
wherein parameter values are applied to the processing graph in the deployment stage if there are any parameters in the processing graph that require user-input prior to deployment, or
wherein parameter values are applied to the processing graph in the execution stage if there are any execution parameter requests,
wherein the parameters are identified from a description of at least one component included in the processing graph and values of the parameters are requested prior to running the processing graph and wherein an output description of an operator representing a first parameter and an input description of an operator representing a first service are matched to each other and the output description of the operator representing the first parameter and an input description of an operator representing a second service are matched to each other so that the value of the first parameter corresponds to a parent node feeding into the first and second services in the processing graph.

* * * * *